(12) United States Patent
Bibo et al.

(10) Patent No.: US 7,759,597 B2
(45) Date of Patent: Jul. 20, 2010

(54) METHOD FOR MANUFACTURING A GAS GENERATOR

(75) Inventors: Christian Bibo, Taufkirchen (DE); Georg Pfister, Muehldorf (DE); Karsten Schwuchow, Wasserburg am Inn (DE); Thomas Kapfelsperger, Muehldorf (DE); Matthias Hennig, Prutting (DE)

(73) Assignee: TRW Airbag Systems GmbH, Aschau am Inn (DE)

(*) Notice: Subject to any disclaimer, the term of this patent is extended or adjusted under 35 U.S.C. 154(b) by 752 days.

(21) Appl. No.: 11/399,105

(22) Filed: Apr. 6, 2006

(65) Prior Publication Data
US 2006/0225280 A1 Oct. 12, 2006

(30) Foreign Application Priority Data
Apr. 6, 2005 (DE) .................. 10 2005 015 788

(51) Int. Cl.
*B23K 11/10* (2006.01)
*B23K 31/02* (2006.01)
(52) U.S. Cl. .............. 219/113; 219/112; 280/728.2
(58) Field of Classification Search .......... 280/736; 219/113; 228/112.1
See application file for complete search history.

(56) References Cited

U.S. PATENT DOCUMENTS 5,000,479 A * 3/1991 Werner et al. .......... 280/736
7,367,584 B2 * 5/2008 Blackburn ............... 280/736
2004/0050281 A1 3/2004 Hofmann et al.
2004/0070186 A1 4/2004 Bierwirth et al.
2004/0200883 A1 * 10/2004 Staheli et al. ........... 228/112.1
2006/0097490 A1 5/2006 Seidl et al.

FOREIGN PATENT DOCUMENTS

| DE | 4102615 | 8/1992 |
|---|---|---|
| DE | 20213555 | 11/2003 |
| DE | 10240640 | 2/2004 |
| DE | 202004011078 | 11/2004 |
| DE | 202004017428 | 3/2005 |

* cited by examiner

*Primary Examiner*—Tu B Hoang
*Assistant Examiner*—Brian Jennison
(74) *Attorney, Agent, or Firm*—Tarolli, Sundheim, Covell & Tummino LLP

(57) ABSTRACT

For manufacturing a gas generator (1), a tubular body (10) having an opening (14) in a circumferential wall (12) and a housing part (16) having an attachment end (26) are provided. The geometry of a proximate rim (20) of the opening (14) and that of the attachment end (26) are coordinated such that a first contact region encircling the opening (14) and a second contact region on the attachment end (26), which is circumferentially closed, are formed. The housing part (16) is placed onto the tubular body (10) such that the first contact region is in contact with the second contact region. Then the body (10) and the housing part (16) are joined to each other by capacitor discharge welding.

10 Claims, 6 Drawing Sheets

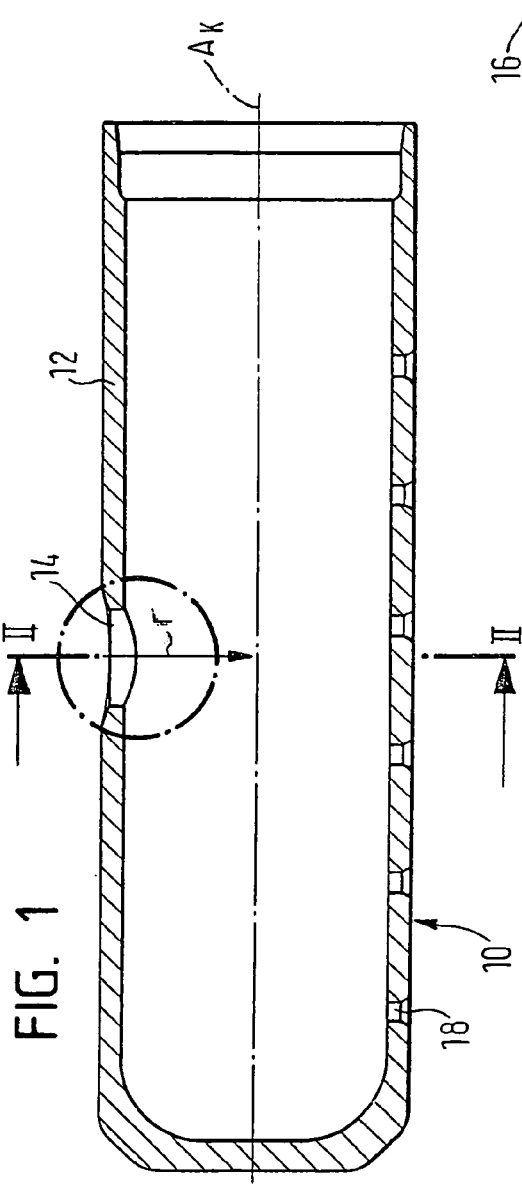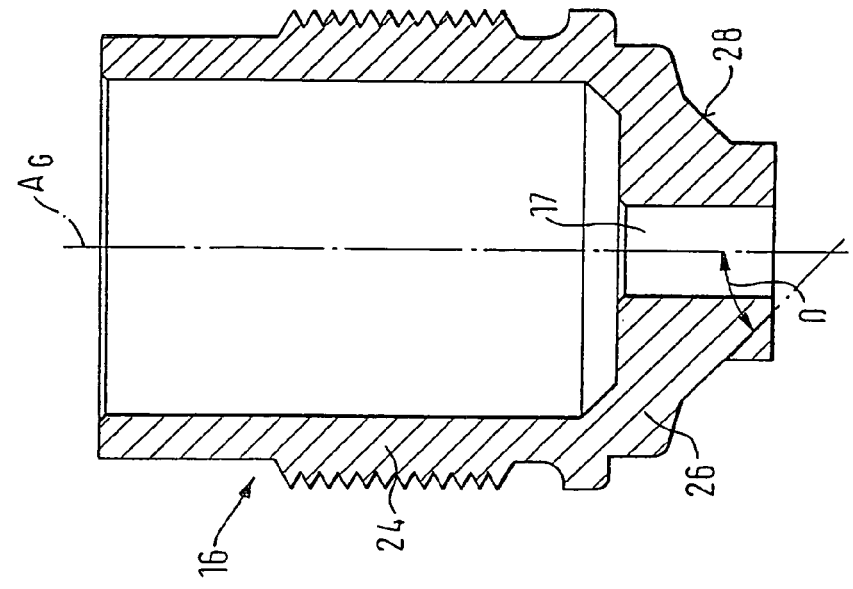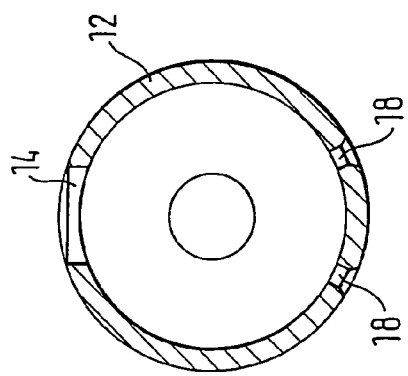

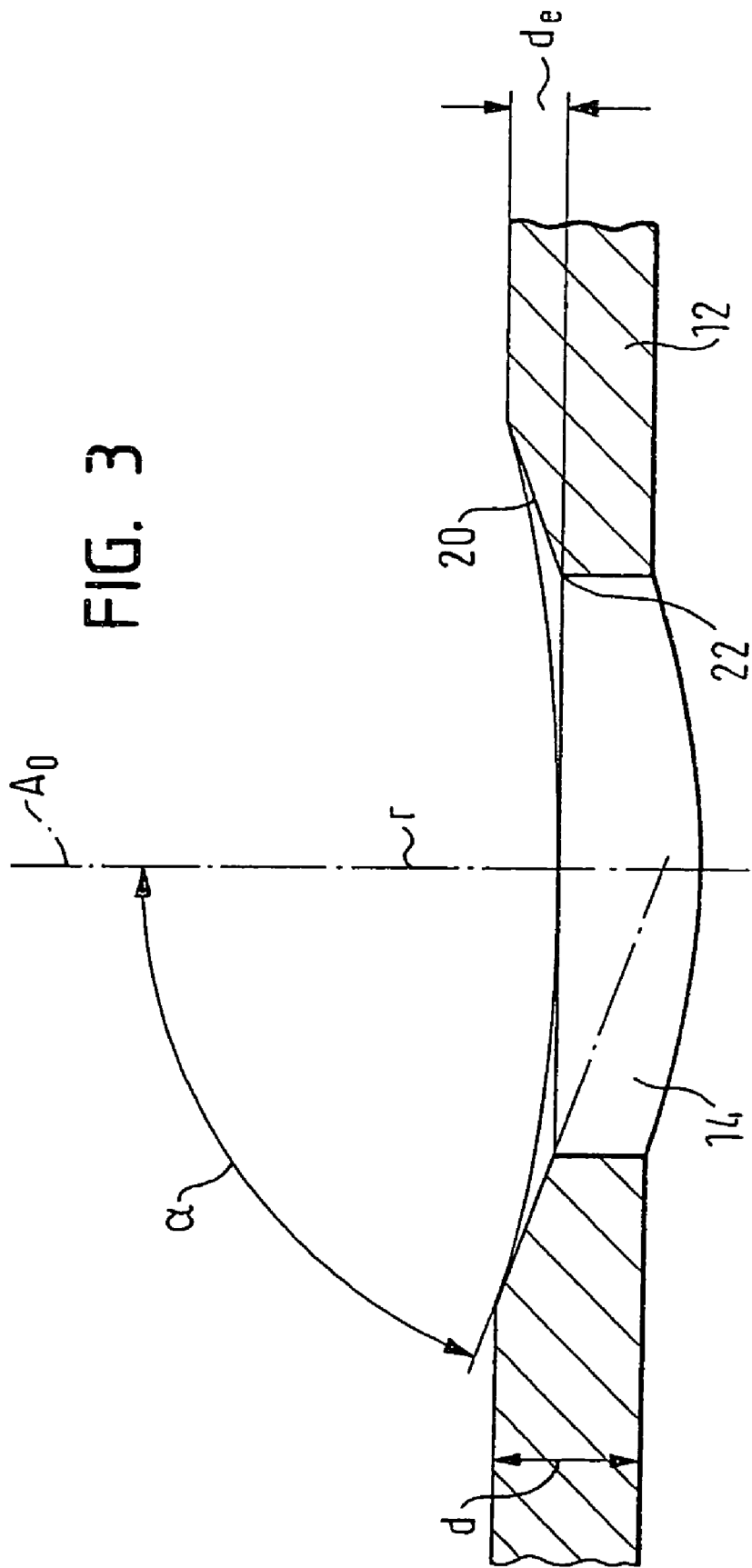

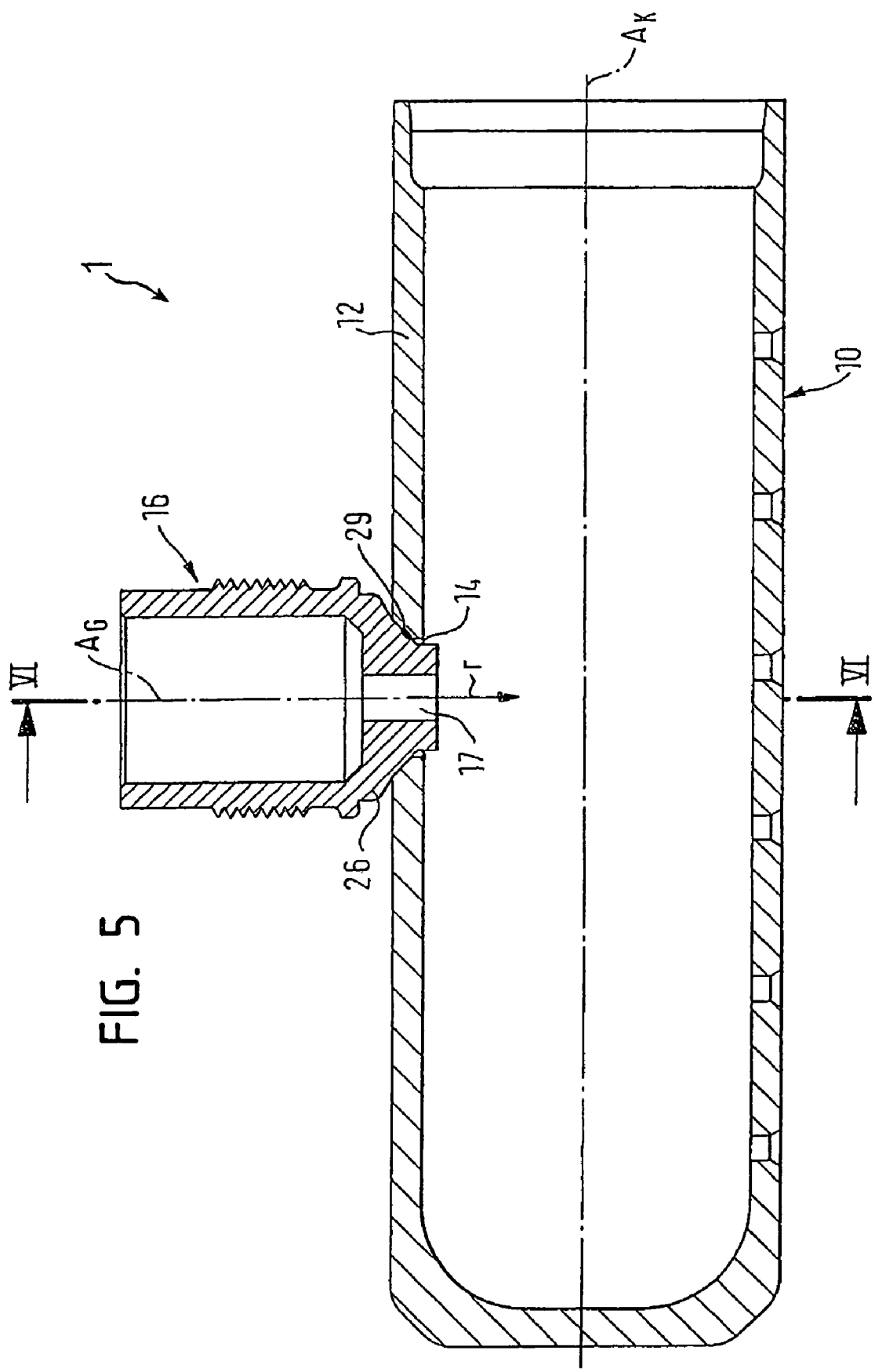

METHOD FOR MANUFACTURING A GAS GENERATOR

FIELD OF THE INVENTION

The present invention relates to a method for manufacturing a gas generator.

BACKGROUND OF THE INVENTION

Especially in the passenger-side area, gas generators have proven to be advantageous that have a tubular, usually elongated body, to which a further housing part is radially attached. The attached housing part can contain an igniter, or it can be configured as a diffuser. This technology makes it possible to manufacture the gas generator simply, because the igniter unit, which is complex in design, does not have to be inserted into the body of the gas generator along with the propellant or pressurized gas. If a radially arranged diffuser is used, it is simpler to lead off the escaping gas in a controlled manner. However, the connection of the radially arranged housing part to the body is critical. In this regard, an approach is sought that would require the least possible expense from the point of view of manufacturing processes but that nevertheless would assure a reliable attachment under the high pressures and temperatures that are present when the gas generator is activated.

BRIEF SUMMARY OF THE INVENTION

It is an object of the present invention to provide a method that satisfies this criterion so that a gas generator can be manufactured at minimal expense.

For this purpose, a method for manufacturing a gas generator comprises the following steps. A tubular body having an opening in a circumferential wall and a housing part having an attachment end are provided. The geometry of a proximate rim of the opening and that of the attachment end are coordinated such that a first contact region encircling the opening and a second contact region on the attachment end, which is circumferentially closed, are formed. The housing part is placed onto the tubular body such that the first contact region is in contact with the second contact region. Then the tubular body and the housing part are joined to each other by capacitor discharge welding.

This approach has the advantage that the circumferential wall of the tubular body does not have to be flattened before the housing part is welded to it. The curvature of the circumferential wall in the area of the opening can be left unchanged with respect to the original body before the welding process. As the weld seam is formed on the proximate rim of the opening, the introduction of force into the body during the capacitor discharge welding is also very favorable because part of the forces is introduced into the circumferential wall via the rim of the opening. This substantially prevents the tubular body from being compressed in the radial direction, which could lead to stress in the annularly surrounding weld seam produced.

Preferably, the first contact region is formed as a contact edge, while the second contact region is formed as a contact surface.

It is acceptable that the weld seam that is produced by the capacitor discharge welding varies in thickness along its circumference because it turned out that despite this phenomenon the weld seam will still satisfy all the requirements with respect to its strength. Of course, the points in the weld seam located furthest toward the exterior in an axial direction of the body are the widest, whereas the sections of the seam that are located furthest towards the interior in the axial direction of the body are the narrowest.

The contact edge is preferably provided on the proximate rim of the opening. The contact edge can be produced by chamfering the rim of the opening. Advantageously, this chamfer is generated by countersinking. The countersink angle can be, e.g., roughly 70° with respect to the central axis of the opening. Through the countersinking process, which occurs in the radial direction with respect to the body, it is possible to produce a contact edge lying in one plane. Of course, for this purpose, the diameter of the opening as well as the thickness of the wall of the tubular body must be selected accordingly.

The diameter of the tubular body is preferably more than double the diameter of the housing part that is placed onto it.

The contact surface can be easily formed by chamfering the attachment end. The attachment end preferably has a truncated-cone-shaped section, the truncated cone-shaped surface forming the contact surface. The chamfer of the attachment end can be at, e.g., an angle of roughly 45° with respect to a longitudinal axis of the housing part. The axis of the truncated cone is preferably congruent with the longitudinal axis of the housing part.

The angle between a longitudinal axis of the housing part and a longitudinal axis of the tubular body is preferably 90°, so the housing part is therefore placed onto the tubular body precisely in the radial direction. As a result of the configuration described above, it is possible to provide a contact surface and a contact edge that create a continuous contact along their circumference between the contact edge and the contact surface when the housing part is placed onto the opening of the tubular body. Through the subsequent capacitor discharge welding, it is possible with only moderate compressive stress to achieve a solid weld seam along the complete circumference of the first and second contact regions.

The cylindrical curvature of the circumferential wall of the body can extend up to the rim of the opening, so that it is not necessary to flatten the tubular body in the area of the opening. The contact edge and the contact surface, which are necessary for the capacitor discharge welding, are configured at the attachment end of the housing part and directly at the rim of the opening of the body.

BRIEF DESCRIPTION OF THE DRAWINGS

FIG. 1 depicts a sectional view of one section of a body of a gas generator according to the present invention;

FIG. 2 depicts a sectional view along the line II-II in FIG. 1;

FIG. 3 enlarges the rim of the opening in FIG. 1;

FIG. 4 depicts an enlarged sectional view of a housing part of a gas generator according to the present invention;

FIG. 5 depicts a sectional view of the housing part in FIG. 4, connected to the body in FIG. 1;

DETAILED DESCRIPTION OF A PREFERRED EMBODIMENT

Figure 7:
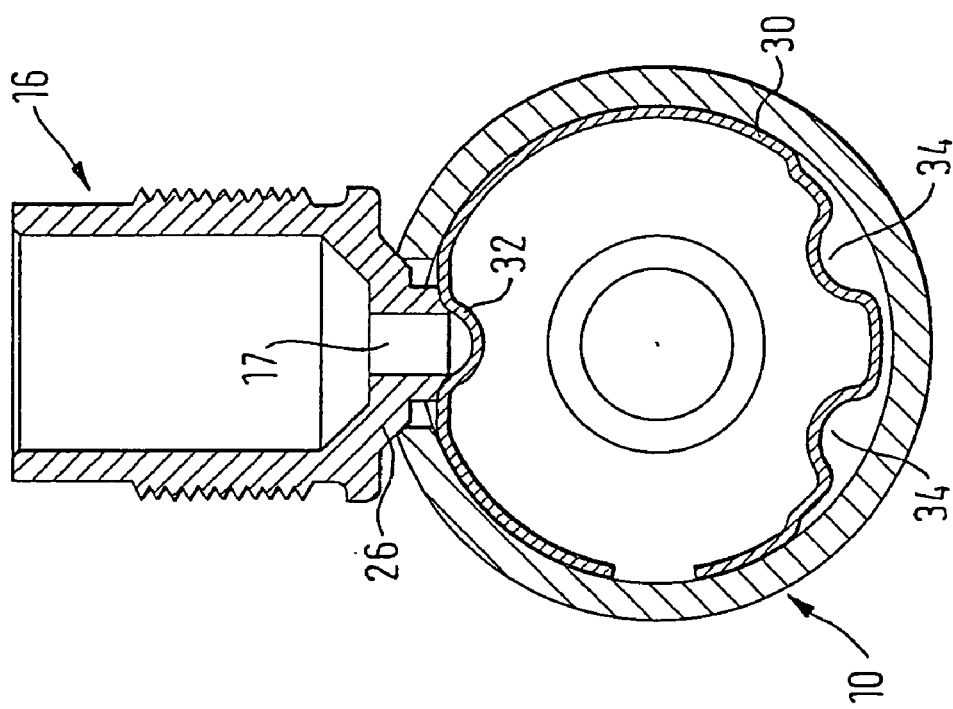
FIG. 7 depicts one variant of the assembly shown in FIG. 6.

The method for manufacturing a gas generator 1 begins with providing a tubular body 10, such as is known, e.g., as the exterior housing of conventional tubular gas generators. The precise shape of the tubular body 10 is not important for the present invention. Tubular body 10 accommodates a propellant, e.g., one or more charges made of solid propellant, pressurized gas, or liquid gas in one or more respective chambers. Tubular body 10 has a radial opening 14 in a curved, in this case cylindrical circumferential wall 12. Housing part 16, shown in FIG. 4, will later be attached to this opening 14 in the radial direction r from an exterior side of tubular body 10. In the example shown, for the gas that is produced in the gas generator, provision is made for outflow openings 18 that are arranged in two parallel rows on the side of circumferential wall 12 that is facing away from opening 14.

The proximate rim 20 of opening 14 is countersunk, in the example shown here at an angle of 70° with respect to the radial direction r, which coincides with a central axis $A_o$ of opening 14. This angle is designated in FIG. 3 as α. As a result of the countersinking, rim 20 of opening 14 is chamfered at least in sections. The depth of the countersink depends on the curvature of circumferential wall 12 in the area of opening 14 as well as on the wall thickness d of circumferential wall 12 in the area of opening 14. As a result of the countersinking, a first contact region in form of a contact edge 22 arises that completely encircles opening 14 at the proximate rim 20 of opening 14. Contact edge 22 is situated in a plane that is perpendicular to the radial direction r and, with respect to the exterior surface of circumferential wall 12, has varying distances from the exterior surface along the circumference of opening 14. A contact edge 22 of this type can be produced as long as the difference in level of rim 20 of opening 14 (perpendicular to a longitudinal axis $A_K$ of tubular body 10) is smaller than or equal to the wall thickness d of circumferential wall 12 in the area of opening 14. In the example shown, tubular body 10 has a diameter of 34 mm, the wall thickness of tubular body 10 is 2.5 mm, the diameter of opening 14 is 10 mm, and depth $d_e$ of the countersink is 1 mm.

Housing part 16, which in this case is essentially tubular, has a cylindrical connecting piece 24 as well as an axially adjoining attachment end 26. Connecting piece 24 can accommodate, e.g., an igniter and, if appropriate, a booster charge. However, it could also be configured as a diffuser for permitting the discharge of the gas produced by the gas generator, or as a solid attachment member that is threaded at the free end. Attachment end 26 of housing part 16 has a bore hole 17 that runs along a longitudinal axis $A_G$ of housing part 16, so that, after housing part 16 is joined to tubular body 10, a continuous flow connection is achieved between the interior of tubular body 10 and the interior of housing part 16.

Attachment end 26 serves to connect housing part 16 to tubular body 10. It has a truncated-cone-shaped section that tapers in the direction of the free end of attachment end 26, the axis of the truncated cone coinciding with longitudinal axis $A_G$ of housing part 16. The exterior surface of the truncated cone forms a second contact region in form of a contact surface 28 that completely encircles axis $A_G$. The maximum diameter of the truncated cone and therefore of contact surface 28 perpendicular to axis $A_G$ is selected so that it is larger than the maximum diameter of opening 14. On the other hand, the minimum diameter of the truncated cone and of contact surface 28 is smaller than the minimum diameter of opening 14.

In the example shown, contact surface 28 runs at an angle of 45° with respect to axis $A_G$, so that the truncated cone encloses an angle of 90°. This angle is designated in FIG. 4 as β. The truncated cone is adjoined by another cylindrical section that subsequently can slightly protrude into the interior of tubular body 10, as can be seen in FIG. 5, for example.

To connect housing part 16 to tubular body 10, housing part 16 at its attachment end 26 is inserted radially from the outside into opening 14. Axes $A_G$ and $A_K$ are perpendicular to each other. Contact edge 22 is now continuously in contact with contact surface 28 around its complete periphery. In the next step, tubular body 10 and housing part 16 are joined to each other through capacitor discharge welding (see FIG. 10). In this process, housing part 16 sinks into tubular body 10 roughly 0.5 to 0.6 mm in the radial direction. The pressure forces applied during the capacitor discharge welding are substantially introduced into circumferential wall 12 of tubular body 10 due to the arrangement of contact edge 22 on rim 20 of opening 14 and of the chamfered, encircling contact surface 28 on housing part 16 and are not transmitted exclusively in the radial direction r to tubular body 10. Therefore, tubular body 10 is only slightly compressed in the radial direction r during the welding process.

Figure 10:
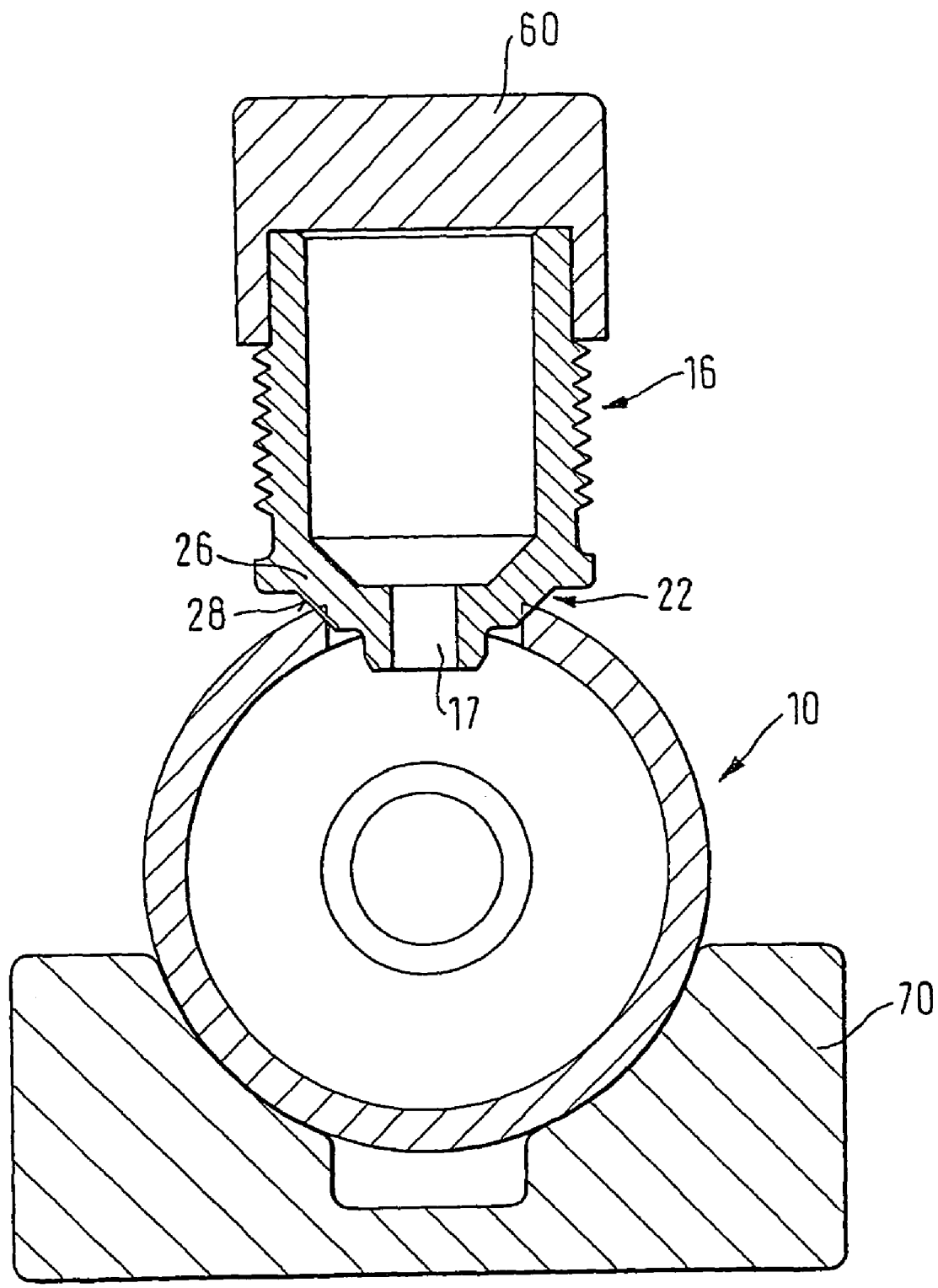
FIG. 10 depicts a sectional view of the gas generator according to the present invention having attached electrodes.

In FIG. 10, tubular body 10 and housing part 16 are shown in contact with electrodes 60, 70, before the welding process. Contact edge 22 is shown schematically. Upper electrode 60 encompasses the free end of housing part 16, which is situated opposite attachment end 26. Upper electrode 60 can be configured, e.g., as a three-part collet chuck. Tubular body 10 is disposed in a trough-shaped lower electrode 70, which is arranged opposite upper electrode 60. In the direction of body longitudinal axis $A_K$, lower electrode 70 has roughly 1.5 times the length of housing part 16, and its attachment end 26.

Figure 6:
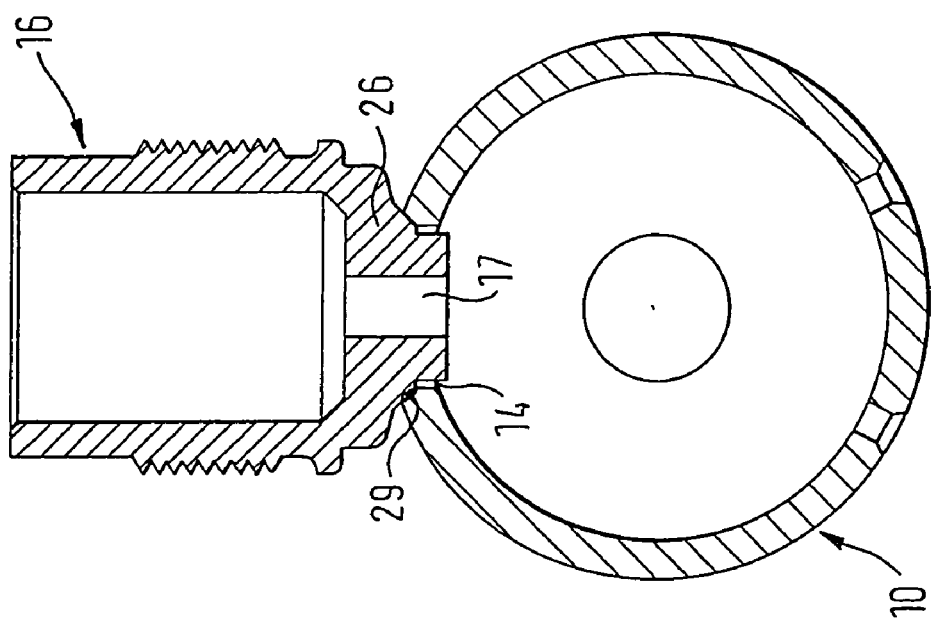
FIG. 6 depicts a sectional view along the line VI-VI in FIG. 5.
Figure 9:
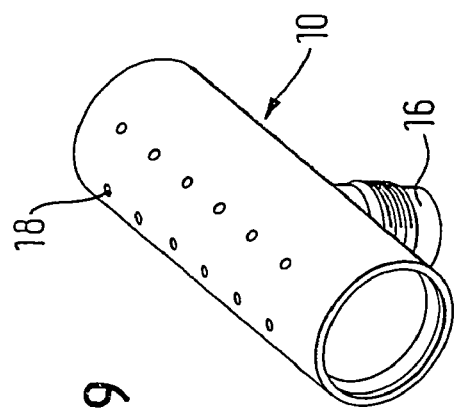
FIGS. 8 and 9 depict perspective views of the body and of the housing part that is connected thereto of a gas generator according to the present invention.
Figure 8:
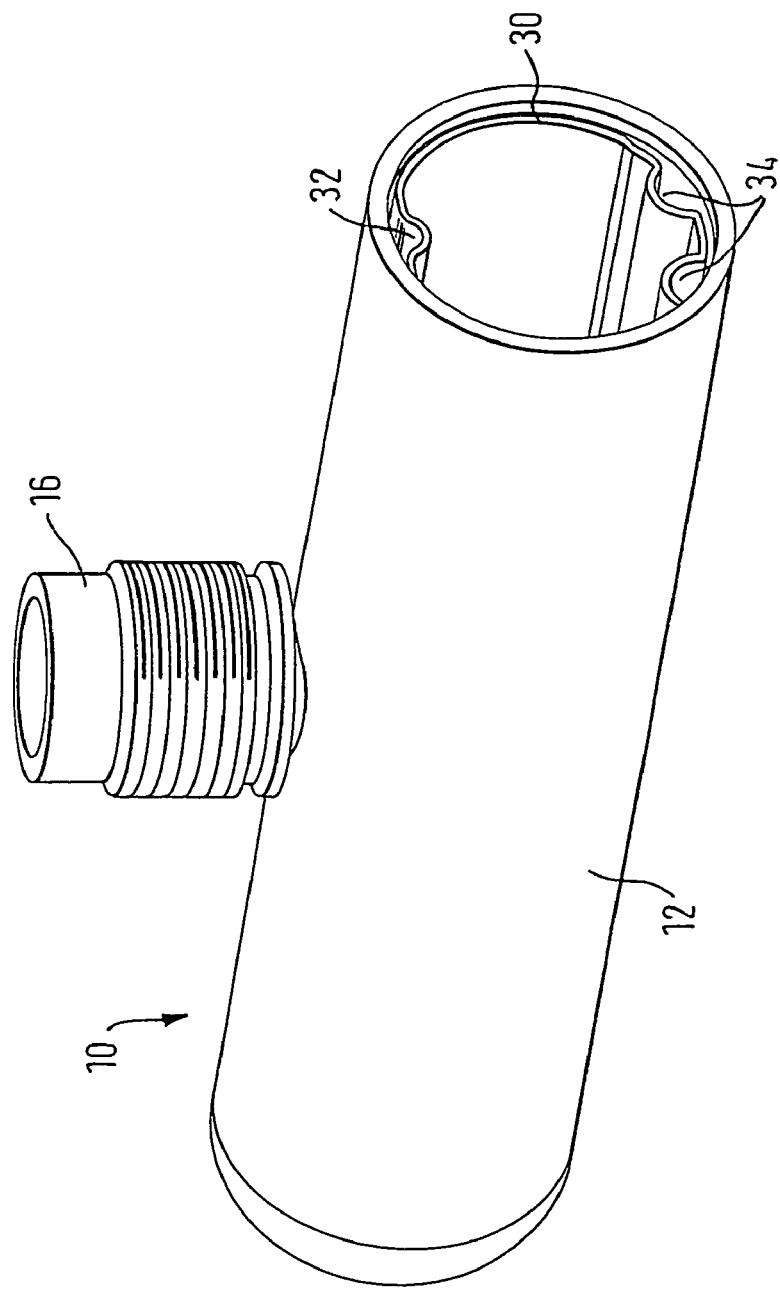

The completely encircling annular weld seam 29 formed by the capacitor discharge welding has varying thicknesses along its circumference. Weld seam 29 is widest in the sections that are situated most toward the exterior with respect to longitudinal axis $A_K$ of tubular body 10. By analogy, weld seam 29 is at its narrowest in the areas that are situated most towards the interior with respect to longitudinal axis $A_K$ of tubular body 10, i.e., in the sections that are offset by 90° with respect to the exterior areas. The contact points shown in FIG. 5 between housing part 16 and tubular body 10 indicate points that have the widest weld seam 29, whereas the analogous contact points shown in FIG. 6 indicate the points having the narrowest weld seam 29 (for reasons of simplicity, this is shown in each case only on one side). Just as in the case of contact edge 22, the level of weld seam 29, as viewed over the circumference of opening 14, varies with respect to the exterior surface of circumferential wall 12.

Because the welded connection is formed on the chamfer of rim 20 of opening 14 of tubular body 10, the weld seam 29 is in contact with several cut layers of circumferential wall 12. These layers arise during the extrusion process of tubular body 10. As a result of this layered structure produced, the weld joint acquires high strength.

To complete the gas generator 1, tubular body 10 is provided with an appropriate propellant as well as with other components that may be called for, such as chamber walls or filters, and then it is closed. The same applies to housing part 16. For example, an ignition unit may be inserted into it.

In FIG. 7, a combustion chamber insert 30 is shown in the interior of body 10. This insert has indentations 32, 34 that are radially oriented toward the inside, of which indentation 32 is arranged directly beneath bore hole 17, whereas indentations 34 are configured so as generally to be diametrically opposite indentation 32. Indentation 32 forms a distribution chamber for the gas that flows in from an ignition unit in housing part 16. Indentations 34 are connected to outflow openings 18 and represent expansion areas for the gas that flows out of the gas generator. Both indentation 32 as well as indentations 34 may extend over the entire axial length of the gas generator 1.

The invention claimed is:

1. A method for manufacturing a gas generator (1) comprising the following steps:
   a) providing a tubular body (10) having a circumferential wall (12) with an opening (14),
   b) providing a housing part (16) having an attachment end (26), wherein a geometry of a proximate rim (20) of the opening (14) and a geometry of the attachment end (26) are coordinated such that a first contact region encircling the opening (14) and a second contact region (28) on the attachment end (26), which is circumferentially closed, are formed,
   wherein the first contact region is formed as a contact edge (22) by means of providing the rim (20) of the opening (14) with a chamfer at least in sections, such that the contact edge (22) is situated in a plane that is perpendicular to a radial direction (r) of the tubular body (10) and, with respect to the exterior surface of circumferential wall (12), has varying distances from the exterior surface along the circumference of opening (14),
   c) thereafter, placing the housing part (16) onto the body (10) such that the contact edge (22) is in contact with the second contact region (28) within said plane, and
   d) joining the tubular body (10) and housing part (16) to each other by capacitor discharge welding.

2. The method recited in claim 1, wherein the second contact region is a contact surface (28).

3. The method as recited in claim 1, wherein a weld seam (29) that is produced by the capacitor discharge welding process varies in thickness along its circumference.

4. The method as recited in claim 1, wherein the chamfer on the rim (20) of the opening (14) is generated by countersinking.

5. The method as recited in claim 4, wherein the countersinking is accomplished at an angle of roughly 70° with respect to a central axis ($A_O$) of the opening (14).

6. The method as recited in claim 2, wherein the contact surface (28) is formed by a chamfer at the attachment end (26).

7. The method as recited in claim 6, wherein the chamfer of the attachment end (26) encloses an angle of roughly 45° with a longitudinal axis ($A_G$) of the housing part (16).

8. The method as recited in claim 1, wherein the angle between a longitudinal axis ($A_G$) of the housing part (16) and a longitudinal axis ($A_K$) of the tubular body (10) is roughly 90°.

9. The method as recited in claim 1, wherein a cylindrical curvature of the circumferential wall (12) extends up to the rim (20) of the opening (14).

10. The method as recited in claim 1, wherein the first contact region is in contact with the second contact region along their complete circumference, when the housing part (16) is placed onto the body (10).

* * * * *